Aug. 6, 1940.   G. S. CROCKETT   2,210,232
SAFETY STEERING WHEEL
Filed July 25, 1939   2 Sheets-Sheet 1

INVENTOR.
Guy S. Crockett
BY Hull, Brock & West
ATTORNEYS.

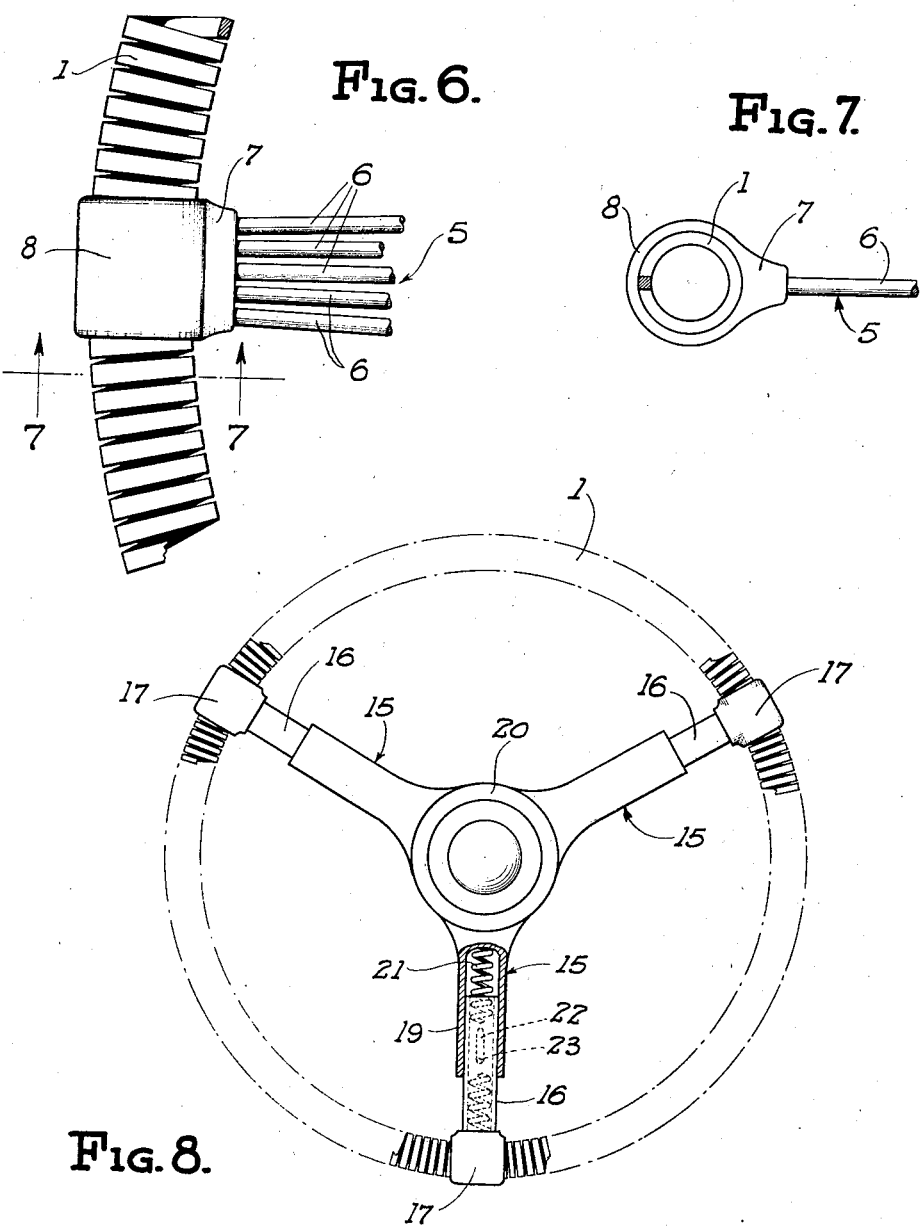

Patented Aug. 6, 1940

2,210,232

UNITED STATES PATENT OFFICE 2,210,232

SAFETY STEERING WHEEL

Guy S. Crockett, Moreland Hills, Ohio

Application July 25, 1939, Serial No. 286,381

4 Claims. (Cl. 74—552)

My present invention, like that constituting the subject matter of my former application Serial No. 273,523, filed May 13, 1939, relates to steering devices or wheels for automotive vehicles.

Serious injury to the drivers of automotive vehicles often results from their being thrown violently against the steering wheels in cases of collisions or other accidents, or sudden stops when traveling at high speed.

It is the purpose of my invention to provide a yielding, shock absorbing steering wheel that is flexible enough in a radial direction to avoid injury to the driver in cases like those above enumerated and yet sufficiently stiff in a circumferential direction to effectively serve its purpose as a steering element.

More limitedly expressed, the main object of the invention is to provide a steering wheel that yields readily in a radial direction at all points throughout its circumference but that resists appreciable deformation in a circumferential direction.

To the attainment of the foregoing, the invention consists, broadly, in the combination of a flexible rim, and a spider comprising spokes that yield in a direction radially of the wheel.

In more specific terms, the invention may be defined as consisting of a steering wheel comprising a flexible steel rim, desirably in the form of a coil spring constructed of wire having a rectangular cross section and wherein the convolutions are relatively close together so as to effect an almost continuous gripping surface except for the narrow spaces between the convolutions that serve to prevent slipping of the hands on the rim, and a spider involving spokes that yield radially but are relatively stiff or rigid in a lateral direction in the plane of the wheel.

Advantages additional to that of protecting the driver from injury, are those of relieving him of fatigue due to the quick and constant vibration of rigid wheels, especially when traveling over rough roads, and the greater ease of getting into and out of the vehicle under a flexible wheel which yields to provide more room for the purpose.

Figure 1:
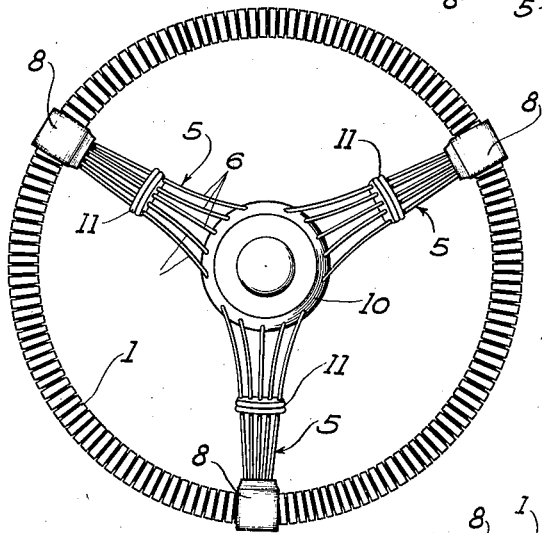
Figure 2:
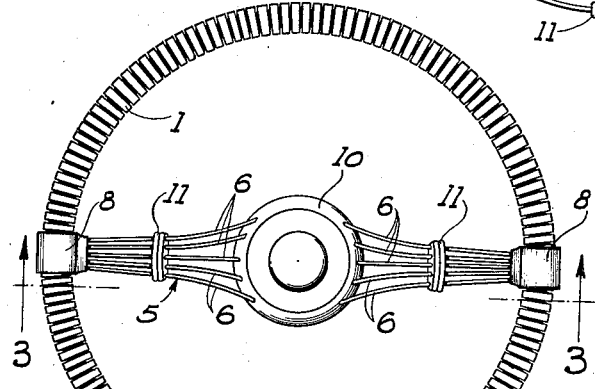
Figure 3:
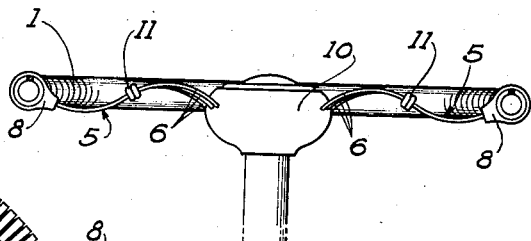
Figure 4:
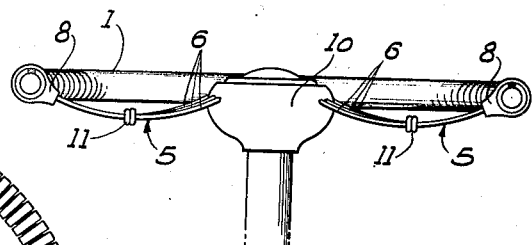
Figure 5:
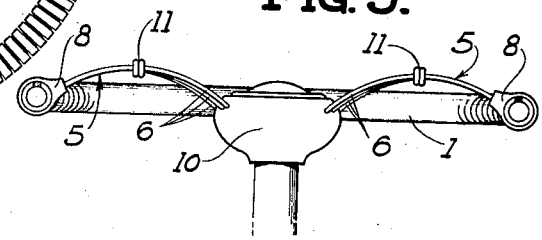

In the accompanying drawings, wherein like reference characters designate corresponding parts throughout the several views, Figs. 1 and 2 are plan views of two embodiments of the invention that differ from each other only in the number of spokes in the spider; Fig. 3 is a section on the line 3—3 of Fig. 2; Figs. 4 and 5 are similar views showing modifications of the spoke formation; Fig. 6 is an enlarged detail of the wheel in the region of a joint between the rim and one of the spokes; Fig. 7 is a section on the line 7—7 of Fig. 6; and Fig. 8 shows a modified form of the invention wherein the spokes of the spider are telescopic.

In all views, the rim of the wheel is designated 1, and in its present preferred form consists of a continuous helical steel wire spring having its ends welded or otherwise secured together, the wire preferably being rectangular in cross section, as best shown in Fig. 6, so as to provide a smooth hand grip. The convolutions of the spring are slightly spaced apart, however, to prevent the hands from slipping, and the rim may be chromium plated or otherwise finished to present an attractive appearance.

According to the forms of the invention illustrated in Figs. 1 to 7, the spokes 5 consist each of a plurality of wires 6 whose outer ends are embedded within or otherwise rigidly secured to bosses 7 of thimbles 8 that encircle and are rigidly attached to the rim 1. The inner ends of the wires 6 of each spoke 5 are securely anchored within the hub 10 of the spider, and intermediate their ends are tied together by a clip 11. The general construction of the spider constitutes no part of my invention, and any one of several approved constructions may be utilized; but I do claim as a part of my invention a formation of each spoke that allows it to yield readily in a direction radially of the wheel. According to Fig. 3, each spoke is of compound curvature or S-shape so as to be capable of yielding as aforesaid when pressure is imposed inwardly against its outer end. It is apparent from the construction described that the spoke will also yield readily axially of the wheel in either direction. It is, however, practically rigid in a direction circumferentially of the wheel.

In Fig. 4 the spokes 5 are bowed downwardly from end to end with respect to the plane of the rim, and in Fig. 5 they are bowed upwardly.

In the form of the invention illustrated in Fig. 8, the spokes 15 are telescopic, each consisting of an inner tubular member 16 whose outer end is fastened, through a thimble 17, to the rim 1, and an inner tubular member 19 that extends radially from the hub 20 and wherein the member 16 has a free sliding fit. A coil spring 21 may be enclosed within each spoke and compressed between the end walls of the respective tubular members 16 and 19. On the underneath side of each spoke a slot 22 may extend longitudinally of the member 19 for the reception of a pin 23 that is carried by the member 16 to limit longitudinal relative movement between the two members.

With respect to each form of the invention herein illustrated, the rim 1 may yield inwardly at any point throughout its circumference, whether such point be directly in line with a spoke or elsewhere. In case of a collision or sudden stop when a spoke is directly in front of the driver and the driver is thrown forwardly against the wheel, both the spoke and rim will yield under the force thus imposed upon them. However, should the wheel be turned so as to place a section of the rim between spokes in front of the driver, the rim will readily yield inwardly under the conditions above described, even though the spokes yield little or not at all. On the other hand, during normal steering operations, the wheel will strongly resist deformation in a circumferential direction due not only to the stiffness of the spring whereof the rim is constituted and its consequential resistance to compression, but also because the spokes are so constructed as to resist lateral deformation in the plane of the rim.

Having thus described my invention, what I claim is:

1. A steering wheel for automotive vehicles comprising, in combination, a flexible rim consisting of a relatively stiff coil spring, and a spider comprising a given number of spokes to all of which the rim is rigidly attached and that are yieldable in a direction radially of the wheel.

2. A steering wheel for automotive vehicles comprising, in combination, an annular rim consisting of a coil spring that is relatively stiff in a circumferential direction but is readily flexible inwardly in a radial direction, and a spider comprising a given number of spokes to the outer ends of whch all of the rim is fixedly attached, said spokes being readily yieldable in a direction radially of the wheel but stiff in a direction circumferentially thereof.

3. A steering wheel for automotive vehicles comprising, in combination, a flexible steel rim, and a spider incorporating spring wire spokes to the outer ends of which the rim is secured and which are of compound curvature from end to end so as to have parts thereof offset in opposite directions axially of the wheel beyond the plane of the rim.

4. A steering wheel for automotive vehicles comprising, in combination, a flexible rim consisting of a coil spring annulus, and a spider incorporating spokes to the outer end of each of which the rim is fixedly secured, each spoke consisting of tubular members that telescope one within the other, and a spring enclosed by each spoke for compression between opposed abutment parts of the respective members.

GUY S. CROCKETT.

CERTIFICATE OF CORRECTION.

Patent No. 2,210,232. August 6, 1940.

GUY S. CROCKETT.

It is hereby certified that error appears in the printed specification of the above numbered patent requiring correction as follows: Page 2, second column, line 9, claim 2, for "whch all of" read --all of which--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.